(12) United States Patent
Oguma et al.

(10) Patent No.: US 11,560,893 B2
(45) Date of Patent: Jan. 24, 2023

(54) METHOD FOR OPERATION CONTROL OF COMPRESSOR AND THE COMPRESSOR

(71) Applicant: HOKUETSU INDUSTRIES CO., LTD., Tsubame (JP)

(72) Inventors: Takahiro Oguma, Tsubame (JP); Hiroyuki Ota, Tsubame (JP)

(73) Assignee: HOKUETSU INDUSTRIES CO., LTD., Niigata (JP)

( * ) Notice: Subject to any disclaimer, the term of this patent is extended or adjusted under 35 U.S.C. 154(b) by 245 days.

(21) Appl. No.: 16/438,852

(22) Filed: Jun. 12, 2019

(65) Prior Publication Data

US 2020/0032801 A1    Jan. 30, 2020

(30) Foreign Application Priority Data

Jul. 25, 2018    (JP) .............................. JP2018-139626

(51) Int. Cl.
*F04C 28/08*    (2006.01)
*F04C 28/24*    (2006.01)
(Continued)

(52) U.S. Cl.
CPC .............. *F04C 28/24* (2013.01); *F04B 41/02* (2013.01); *F04B 49/002* (2013.01); *F04B 49/06* (2013.01);
(Continued)

(58) Field of Classification Search
CPC .......... F04C 28/06; F04C 28/08; F04C 28/24; F04C 2270/051; F04C 2270/185;
(Continued)

(56) References Cited

U.S. PATENT DOCUMENTS

| 6,082,971 A * | 7/2000 | Gunn | .................... F04B 39/066 |
| | | | 417/32 |
| 2006/0193728 A1* | 8/2006 | Lindsey | .................. F04B 49/03 |
| | | | 417/1 |

(Continued)

FOREIGN PATENT DOCUMENTS

CN    1840906 A  * 10/2006
CN    1840906 A    10/2006
(Continued)

OTHER PUBLICATIONS

Wikipedia Page for Engine Control Unit, published Jun. 6, 2018; URL: https://en.wikipedia.org/w/index.php?title=Engine_control_unit&oldid=844667953 (Year: 2018).*

(Continued)

*Primary Examiner* — Thomas Fink
(74) *Attorney, Agent, or Firm* — Ronald M. Kachmarik; Cooper Legal Group LLC

(57) ABSTRACT

In a method for operation control of a compressor, full-load running in which a gas intake control valve is fully open and a target rotation speed of a drive source is set to a full-load rotation speed that is a maximum rotation speed in a speed control band when pressure of compressed gas supplied to the consumption side is a datum pressure or less is carried out; then no-load running in which the valve is fully closed and a no-load rotation speed is set as the target rotation speed of the drive source when the supply pressure is a no-load running pressure or less that is a pressure higher than the datum pressure is carried out. The no-load running is started from the standard no-load rotation speed, however, after a transition time, the target rotation speed is reduced to a low speed no-load rotation speed.

13 Claims, 4 Drawing Sheets

(51) Int. Cl.
*F04B 41/02* (2006.01)
*F04B 49/00* (2006.01)
*F16K 15/18* (2006.01)
*F04B 49/06* (2006.01)
*F04C 28/06* (2006.01)
*F04B 49/20* (2006.01)
*F04B 49/03* (2006.01)

(52) U.S. Cl.
CPC .............. *F04B 49/20* (2013.01); *F04C 28/06* (2013.01); *F04C 28/08* (2013.01); *F16K 15/18* (2013.01); *F04B 49/03* (2013.01); *F04C 2270/051* (2013.01)

(58) Field of Classification Search
CPC ............ F04C 2270/58; F04C 2270/585; F04C 2270/205; F04B 49/08; F04B 49/20; F04B 49/02; F04B 49/03
USPC .................. 417/20, 43, 44.2, 44.3, 295, 298

See application file for complete search history.

(56) References Cited

U.S. PATENT DOCUMENTS

| | | | |
|---|---|---|---|
| 2011/0194963 A1* | 8/2011 | Kawabata | F04C 18/0223 418/55.1 |
| 2012/0156079 A1* | 6/2012 | Hirata | F04C 18/16 418/201.1 |
| 2017/0051743 A1 | 2/2017 | Sakai et al. | |
| 2018/0223832 A1* | 8/2018 | Ren | F04B 49/065 |
| 2018/0291902 A1* | 10/2018 | Thomes | F04C 28/02 |
| 2020/0011324 A1* | 1/2020 | Oshiro | F04B 49/08 |
| 2021/0017988 A1* | 1/2021 | Hase | F04C 18/16 |
| 2021/0054836 A1* | 2/2021 | Snels | F04B 49/225 |

FOREIGN PATENT DOCUMENTS

| | | | | |
|---|---|---|---|---|
| CN | 103541889 A | * | 1/2014 | |
| CN | 103541889 A | | 1/2014 | |
| JP | 2011038466 A | * | 2/2011 | |
| JP | 5325701 | | 10/2013 | |
| JP | 5325701 B2 | * | 10/2013 | |
| WO | WO-2018179789 A1 | * | 10/2018 | .............. F04C 28/08 |

OTHER PUBLICATIONS

Office Action from corresponding Chinese Application No. CN201910667213.2 dated Jul. 8, 2022, 9 pages.

* cited by examiner

METHOD FOR OPERATION CONTROL OF COMPRESSOR AND THE COMPRESSOR

BACKGROUND OF THE INVENTION

1. Field of the Invention

The present invention relates to a method for operation or running control of a compressor including a feature of rotation speed control, and to a compressor that executes the said operational method.

2. Description of the Related Art

As an example of a compressor, a configuration of an engine-driven compressor 700 provided with an oil-cooled screw compressor body that compresses lubrication oil employed to lubricate, cool, and seal a compression work chamber, and that compresses air or gas (hereafter both referred to as "gas") to be subjected to compression, will be described with reference to FIG. 4.

The engine-driven compressor 700 is provided with a compressor body 740, a drive source such as an engine or a motor to drive the compressor body 740 (an engine 750 in the illustrated example), and also a receiver tank 760. The compressor body 740 first introduces into the receiver tank 760 compressed gas that has been discharged together with the lubrication oil and performs gas-liquid separation thereon, in a configuration in which the compressed gas after lubrication oil has been separated therefrom is then supplied to a consumption side to which pneumatic work tools have been connected.

The pressure of the compressed gas in the receiver tank 760 is then utilized to reintroduce the lubrication oil recovered in the receiver tank 760 in this manner into an oil fill port of the compressor body 740 through an oil fill passage 764 provided with an oil cooler 763 and the like, so as to reuse the lubrication oil to lubricate, cool, and seal the compression work chamber.

The thus configured engine-driven compressor 700 performs capacity control to generate compressed gas at a required rate according to changes in the rate of consumption of compressed gas on the consumption side, so as to enable compressed gas to be supplied to the consumption side at a stable pressure.

The capacity control is performed according to changes in pressure inside a passage communicating the receiver tank 760 or a passage or the like connected to the receiver tank 760 with the consumption side (hereafter referred to as "supply pressure P"), so that a pressure of compressed gas supplied to the consumption side approaches a set pressure. This capacity control is achieved by performing "full-load running", "no-load running", and "increase-rate/decrease-rate running" as described below.

The "full-load running" thereof is running performed when the supply pressure P is less than a predetermined datum pressure P2. In the "full-load running", a gas intake control valve 711 provided to an inlet port of the compressor body 740 is fully opened, and running is performed to raise the rotation speed of the engine 750 to a full-load rotation speed that is the highest speed in a speed control band. This quickly raises the supply pressure P to the datum pressure P2 or above.

Moreover, the "no-load running" is running performed when the supply pressure P is equal to or greater than a no-load running pressure P3 set as a predetermined pressure higher than the datum pressure P2. In the "no-load running", the supply pressure P is suppressed from rising by fully closing the gas intake control valve 711 provided to the inlet port of the compressor body 740, and by lowering the rotation speed of the engine 750 to a no-load rotation speed that is the lowest speed in the speed control band.

Furthermore, the "increase-rate/decrease-rate running" is running performed when the supply pressure P is equal to or greater than the datum pressure P2 but less than the no-load running pressure P3. In the "increase-rate/decrease-rate running", the gas intake control valve 711 is restricted and the rotation speed of the engine 750 is reduced in speed in response to a rise in the supply pressure P, and the gas intake control valve 711 is opened and the rotation speed of the engine 750 is increased in speed in response to a fall in the supply pressure P. The supply pressure P is thereby controlled so as to be maintained in a range equal to or greater than the datum pressure P2 but less than the no-load running pressure P3.

There is a proposal to provide the engine-driven compressor 700 that performs the capacity control as described above with a purge mechanism to open the discharge side of the compressor body 740 to the atmosphere during no-load running in order to decrease the power during the no-load running.

As such a purge mechanism, the engine-driven compressor 700 illustrated in FIG. 4 is configured with a purge valve 714, which is a solenoid open/close valve, that is in communication with a discharge passage 762 on the primary side of a check valve 761 provided somewhere along a passage extending from the compressor body 740 to the consumption side, and with a pressure sensor 767 that detects a pressure on the secondary side of the gas intake control valve 711, and with a pressure sensor 769 to detect the pressure inside a consumption passage 768 connected to the secondary side of the check valve 761, and with a controller 733 that outputs a control signal to control the opening and closing of the purge valve 714 according to a pressure detected in each section by the pressure sensors 767, 769.

There is a proposal for such a purge mechanism (FIG. 1 of Japanese Patent No. 5325701) in which the engine-driven compressor 700 transitions to the no-load running and the gas intake control valve 711 provided to the inlet port of the compressor body 740 is closed, and when the pressure on the secondary side of the gas intake control valve 711 detected by the pressure sensor 767 becomes equal to or less than a predetermined purge-open start pressure lower than atmospheric pressure, the controller 733 opens the purge valve 714 and performs gas discharge through an air filter AF provided on the primary side of the gas intake control valve 711. After opening the purge valve 714, the purge valve 714 is subsequently closed and gas release ended when the pressure inside the consumption passage 768 detected by the pressure sensor 769 becomes equal to or less than a predetermined pressure lower than the pressure inside the consumption passage 768 at the point in time when the purge valve 714 was opened.

Note that although in the configuration described above an example was given of the engine-driven compressor 700 having the engine 750 as the drive source, the load during no-load running may be reduced by performing similar capacity control and purging for motor-driven compressors in which the drive source is an electric motor.

In the engine-driven compressor 700 equipped with the purge mechanism described above, by opening the purge valve 714 and opening the discharge passage 762 to the atmosphere when a transition is made to no-load running, the pressure on the discharge side of the compressor body 740 falls, and as a result the compressor body 740 can be run in a state of reduced load. This enables the engine 750 to achieve a reduction in fuel consumed.

However, with the current heightened sensitivity of society to environment concerns, there are also various issues other than the attempting to reduce running cost, such as a concern to limit the discharge of carbon dioxide in order to prevent global warming, a concern regarding depletion of fossil fuels, and the like. There is accordingly a desire for an even greater reduction in fuel cost and reduction in power consumption for devices that are installed with drive sources such as engines, motors, and the like. There is also no exception made for compressors driven by engines and motors as described above, and further reductions in fuel cost and reductions in power consumption are also demanded for such compressors.

A given amount of time is needed to raise the rotation speed of an engine or motor serving as the drive source, such as when consumption of compressed gas has resumed on the consumption side during no-load running. Thus even when a transition is made to full-load running, there is a time lag until the rotation speed of the engine or motor is raised from the no-load rotation speed to the full-load rotation speed. Such a time lag is greater the greater the difference between the no-load rotation speed and the full-load rotation speed.

Thus the time needed until an increase is achieved in the rate of compressed gas discharged by the compressor body is longer the lower the setting for the no-load rotation speed. This means that the drop in the supply pressure P relative to the datum pressure P2 is large in cases in which compressed gas starts to be consumed at a great rate immediately after starting up pneumatic work tools.

In particular, in a configuration such as that of the engine-driven compressor 700 described with reference to FIG. 4 in which a "purge" is performed to open the discharge passage 762 to the atmosphere during no-load running, the pressure inside the discharge passage 762 and the receiver tank 760 is caused to rise to a pressure equal to or greater than the datum pressure P2 from a state in which the pressure has fallen to atmospheric pressure. This means that if the rotation speed is set to a no-load rotation speed equivalent to that when purging is not performed, then the supply pressure P will fall greatly with respect to the datum pressure P2 when a transition is made from no-load running to full-load running.

Each of the pneumatic work tools connected to the consumption side have a pressure range of the compressed gas that should be introduced thereto, defining a usable air pressure. When the compressed gas is supplied to the pneumatic work tools at a pressure lying outside of these usable air pressure ranges then this might cause the pneumatic work tools to no longer operating normally, or cause the lifespan of the pneumatic work tools to be shortened or malfunctions to occur.

Thus in a compressor provided with a capacity control device of such a configuration, and in particular in a compressor provided with a purge mechanism, the drop in the supply pressure P relative to the datum pressure P2 when transitioning from no-load running to full-load running is made small, and the no-load rotation speed, which is the rotation speed of the engine during no-load running, needs to be set to a higher rotation speed than the minimum required rotation speed to maintain running of the engine and the compressor body in order to be able to quickly raise the supply pressure P to a pressure equal to or greater than the datum pressure P2. These measures have an adverse effect on the fuel cost during no-load running.

When pneumatic work tools connected to the consumption side are pneumatic work tools that need a large power from immediately after starting up, such as a concrete breaker, then supplying compressed gas below the usable gas pressure range defined for such pneumatic work tools sometimes causes running problems such as not being able to obtain the required impact force. For the pneumatic work tools connected to the consumption side there are also, however, some work tools that would not experience great problems in operation even if compressed gas were to be temporarily supplied at below the usable gas pressure range at startup, e.g. an air blower.

The present invention is accordingly designed to solve the deficiencies with the related technology described above, and an object of the present invention is to provide a method for operation control of a compressor capable of achieving further reductions in fuel cost or reductions in power consumption and reductions in noise, while still securing the operation of pneumatic work tools connected to the consumption side. This is achieved by reconsidering the no-load rotation speed, which in compressors has hitherto been set to a single invariable rotation speed irrespective of the type of connected pneumatic work tools.

SUMMARY OF THE INVENTION

Means for solving the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the above object, the present invention provides a method for operation control of a compressor 1. In the method for operation control of the compressor 1 to perform capacity control configured by control of a gas intake rate using a gas intake control valve 11 provided in a gas intake port 41 of a compressor body 40 and by control of a rotation speed of a drive source (an engine 50 in an illustrated example) driving the compressor body 40 so that a pressure of compressed gas supplied to a consumption side lies within a predetermined range, the capacity control comprises:

full-load running in which the gas intake control valve 11 is fully open and a target rotation speed of the drive source 50 is set to a full-load rotation speed (for example, 3200 $min^{-1}$) that is a maximum rotation speed in a speed control band when a supply pressure P that is a pressure of compressed gas supplied to the consumption side is equal to or less than a predetermined datum pressure P2; and no-load running in which the gas intake control valve 11 is fully closed and a predetermined no-load rotation speed is set as the target rotation speed of the drive source 50, when the supply pressure P is equal to or greater than a no-load running pressure P3 that is a predetermined pressure higher than the datum pressure P2;

starting the no-load running with a predetermined standard no-load rotation speed (for example, 1800 $min^{-1}$) that is lower than the full-load rotation speed (for example, 3200 $min^{-1}$) set as the target rotation speed; and performing target speed change processing in which the target rotation speed is reduced in speed to a low speed no-load rotation speed (for example, 1400 $min^{-1}$) that is a predetermined rotation speed lower than the standard no-load rotation speed (for example, 1800 min$^{-1}$) after a predetermined transition time "t" (for example, 20 seconds) has elapsed from starting the no-load running, and then continuing to perform the no-load running.

Preferably, the transition time (setting time) t is configured so as to be variable with zero selectable as the transition time.

Furthermore, it is preferable that the target speed change processing is not performed in the no-load running until a discharge gas temperature or a lubrication oil temperature of the compressor body 40 is a predetermined temperature (for example, 60° C.) or higher.

The method may be configured so that a check valve 61 is provided partway along a passage extending to the consumption side from a discharge port of the compressor body 40;

the capacity control is performed using a pressure on a secondary side of the check valve 61 as the supply pressure P; and purging is performed during no-load running by opening a discharge side of the compressor body 40 to the atmosphere at a primary side of the check valve 61.

The purging may be performed after starting the no-load running and after the transition time "t" has elapsed.

A compressor 1 of the present invention is characterized by comprising:

a capacity control device 2 configured to perform control of a gas intake rate using a gas intake control valve 11 provided to a gas intake port 41 of a compressor body 40 and to perform control of a rotation speed of a drive source (an engine 50 in the illustrated example) driving the compressor body 40 so that compressed gas is supplied to a consumption side at a pressure lying within a predetermined range;

the capacity control device 2 being configured to perform full-load running in which the gas intake control valve 11 is fully open and a target rotation speed of the drive source 50 is set to a full-load rotation speed (for example, 3200 min$^{-1}$) that is a maximum rotation speed in a speed control band when a supply pressure P that is a pressure of compressed gas supplied to the consumption side is equal to or less than a predetermined datum pressure P2; and perform no-load running in which the gas intake control valve 11 is fully closed and a predetermined no-load rotation speed is set as the target rotation speed of the drive source 50, when the supply pressure P is equal to or greater than a no-load running pressure P3 that is a predetermined pressure higher than the datum pressure P2;

start the no-load running with a predetermined standard no-load rotation speed (for example, 1800 min$^{-1}$) that is lower than the full-load rotation speed (for example, 3200 min$^{-1}$) set as the target rotation speed; and perform target speed change processing in which the target rotation speed is reduced in speed to a low speed no-load rotation speed (for example, 1400 min$^{-1}$) that is a predetermined rotation speed lower than the standard no-load rotation speed (for example, 1800 min$^{-1}$) after a predetermined transition time "t" (for example, 20 seconds) has elapsed from starting the no-load running, and then continue to perform the no-load running.

The compressor 1 may be configured so that by operating switches 151, 152 provided to an operation panel 15 a user is able to select, as the no-load running performed by the capacity control device 2, from:

no-load running (automatic speed reduction mode) performed according to the target speed change processing; or no-load running (normal mode) in which the target speed change processing is not performed and instead the no-load rotation speed has the standard no-load rotation speed (for example, 1800 min$^{-1}$) set as the target rotation speed.

The compressor 1 may be configured so that by operating the switches 151, 152 provided to the operation panel 15 a user is able to further select as the no-load running performed by the capacity control device 2:

no-load running (low speed mode) in which the target speed change processing is not performed, and instead the no-load rotation speed has the low speed no-load rotation speed (for example, 1400 min$^{-1}$) set as the target rotation speed.

The following advantageous effects can be obtained by the adopting the configuration of the present invention and the operation control method of the compressor 1 of the present invention, as described above.

In the configuration, no-load running is performed with target speed change processing in which no-load running in the capacity control is started at a predetermined standard no-load rotation speed (for example, 1800 min$^{-1}$) lower than a full-load rotation speed (for example, 3200 min$^{-1}$) set as the target rotation speed, and then, after a set transition time "t" has elapsed from starting the no-load running, the target rotation speed is changed to a low speed no-load rotation speed (for example, 1400 min$^{-1}$) that is a predetermined rotation speed lower than the standard no-load rotation speed (for example, 1800 min$^{-1}$). Appropriately setting the transition time "t" to match driving patterns etc. enables running problems and the like resulting from a fall in pressure of compressed gas supplied when pneumatic work tools are restarted within the transition time "t" to be prevented from occurring even in cases in which pneumatic work tools that generate a large force immediately after starting up, such as a concrete breaker, are connected to the compressor 1. Moreover, action of heavy-load work tools can be guaranteed while realizing an improvement in fuel costs and a reduction in noise of an engine by lowering the no-load rotation speed to the low speed no-load rotation speed (for example, 1400 min$^{-1}$) in cases in which the pneumatic work tools remain in an inactive state for a prolonged period of time exceeding the set transition time "t".

Moreover, when the pneumatic work tools connected to the consumption side are pneumatic work tools such as an air blower that would not experience problems in operation even when compressed gas is introduced initially at startup at a pressure less than the usable pressure range, then an even greater lowering of fuel costs can be achieved by setting the transition time "t", which is the time from the start of no-load running until switching to the low speed no-load rotation speed, to "0 (zero)", and transitioning the target rotation speed to the low speed no-load rotation speed (for example, 1400 min$^{-1}$) immediately at the start of no-load running.

Furthermore, by adopting a configuration in which the target speed change processing is not performed for no-load running when the discharge gas temperature or the lubrication oil temperature of the compressor body 40 is less than a predetermined temperature (for example, 60° C.), a situation can be prevented in which the drive source such as the engine 50 stops due to a high load accompanying insufficient warming up of the compressor. This is achieved by maintaining the standard no-load rotation speed (for example, 1800 min$^{-1}$) and not transitioning the no-load rotation speed to the low speed no-load rotation speed (for example, 1400 min⁻¹) in a state in which the compressor body 40 has not completely warmed up when being used in a cold environment or the like and there is a large load incurred due to the high viscosity of the lubrication oil. This also enables warming of the compressor body 40 to be completed early.

Furthermore, in the configuration the check valve 61 is provided somewhere along a pipe communicating with the discharge port of the compressor body 40, and the capacity control described above is performed by taking changes to the pressure on the secondary side of the check valve 61 as changes to the supply pressure P, and by opening the discharge side of the compressor body to the atmosphere at the primary side of the check valve 61 during no-load running by performing a so-called "purge". This enables even lower fuel costs and even lower power consumption to be achieved in no-load running by both lowering the rotation speed in accordance with the target speed change processing described above, and by lowering the back pressure of the compressor body 40.

In particular, in a configuration in which the purge is performed after no-load running has started and the set transition time "t" has elapsed, a drop in the supply pressure P can be suppressed from occurring when a transition is made from the no-load running to the full-load running within the transition time "t", and the supply pressure P can be raised quickly to a pressure of the datum pressure P2 or greater. This enables operation of the pneumatic work tools to be secured, while also making a beneficial contribution to reducing fuel costs and reducing power consumption accompanying purging.

BRIEF DESCRIPTION OF THE DRAWINGS

The objects and advantages of the invention will become understood from the following detailed description of preferred embodiments thereof in connection with the accompanying drawings in which like numerals designate like elements, and in which.

DETAILED DESCRIPTION OF THE PREFERRED EMBODIMENTS

Description follows regarding an example of a configuration of a compressor that executes an operational control method of the present invention, by describing an example of an engine-driven compressor 1 provided with an oil-cooled screw compressor body.

Overall Structure of Engine-Driven Compressor

Figure 1:
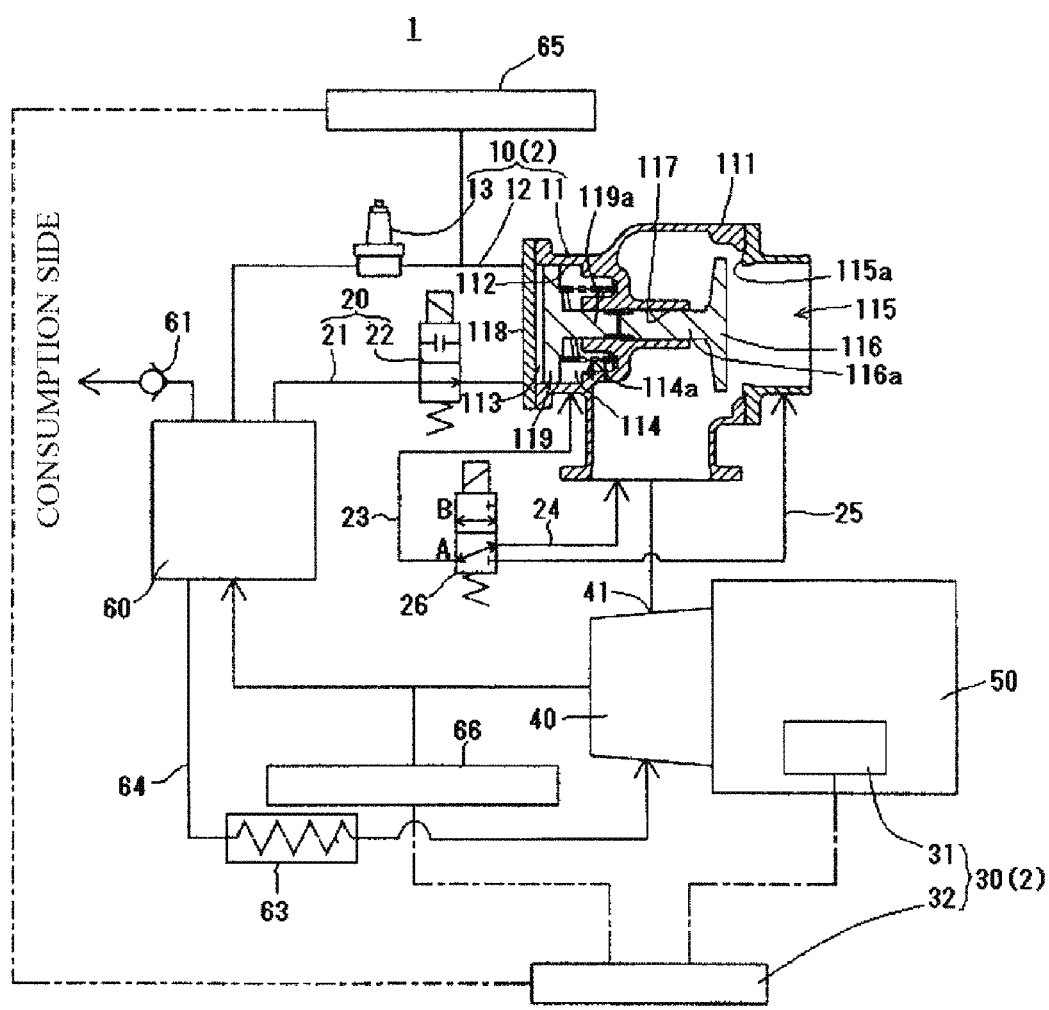
FIG. 1 is an explanatory diagram of an engine-driven compressor that executes the operational control method of the present invention.

FIG. 1 illustrates an engine-driven compressor 1 that executes an operational control method of the present invention. The engine-driven compressor 1 includes a compressor body 40, an engine 50 to drive the compressor body 40, and a receiver tank 60 to store compressed gas discharged from the compressor body 40, in a configuration in which the compressed gas discharged from the compressor body 40 is stored in the receiver tank 60, then being supplied to a consumption side to which non-illustrated pneumatic work tools and the like are connected.

The engine-driven compressor 1 subject to the control of the present invention is installed with an oil-cooled screw compressor serving as the compressor body 40 that compresses lubrication oil employed to lubricate, cool, and seal a compression work chamber, and compresses gas to be subjected to compression. The compressor body 40 first introduces into the receiver tank 60 compressed gas that has been discharged together with the lubrication oil and performs gas-liquid separation of the compressed gas and the lubrication oil, in a configuration in which the compressed gas after lubrication oil has been separated therefrom is then supplied to a consumption side. The lubrication oil recovered in the receiver tank 60 is refilled into the compressor body 40 through an oil fill passage 64 provided with an oil cooler 63, in a configuration enabling the lubrication oil to be recirculated and reused.

Capacity Control Device

In order for the engine-driven compressor 1 configured as described above to be able to supply compressed gas at a stable pressure to the consumption side, capacity control is performed to control the gas intake to the compressor body 40 and to control the rotation speed of the engine 50, according to changes in a supply pressure P, which is a pressure at which the compressed gas is supplied to the consumption side.

In order to perform such capacity control, the illustrated engine-driven compressor 1 is provided with a capacity control device 2 configured from a gas intake control device 10 to control the opening and closing of a gas intake port 41 of the compressor body 40, and from a speed control device 30 to control the rotation speed of the engine 50.

(1) Gas Intake Control Device

The gas intake control device 10 controls the opening and closing of the gas intake port 41 of the compressor body 40 according to changes in the supply pressure P as described above. In the present exemplary embodiment, the thus configured gas intake control device 10 is, in the example illustrated, accordingly configured to open or close the gas intake port 41 of the compressor body 40 by being configured with a normally open gas intake control valve 11, a control passage 12 communicating a valve closure pressure receiving chamber 113 of the gas intake control valve 11 with the receiver tank 60, and with a pressure regulation valve 13 to open or close the control passage 12.

The thus configured pressure regulation valve 13 performs opening and closing operations according to a pressure at a primary side thereof, i.e. according to a pressure inside the receiver tank 60. The pressure regulation valve 13 is accordingly configured so that the control passage 12 is closed when the pressure inside the receiver tank 60, and consequently the supply pressure P, which is a pressure the compressed gas is supplied to the consumption side at, is less than a predetermined datum pressure P2, which is an operation start pressure of the pressure regulation valve 13, and so that the control passage 12 starts to be opened when this pressure is the datum pressure P2 or greater. The pressure regulation valve 13 is configured to fully open the control passage 12 when the pressure inside the receiver tank 60 has reached a no-load running pressure P3.

From out of the configuration elements of the gas intake control device 10 described above, the gas intake control valve 11 is a configuration element that performs a valve closing operation when compressed gas from inside the receiver tank 60 is introduced into the valve closure pressure receiving chamber 113, to thereby restrict or close the gas intake port 41 of the compressor body 40. In the illustrated exemplary embodiment, an inlet passage 115 is formed by a space formed inside a body (valve box) 111 so as to communicate with the gas intake port 41 of the compressor body 40. The inlet passage 115 is closed by a valve body 116 being seated in a valve seat 115a provided inside the inlet passage 115, in a configuration that thereby enables the gas intake port 41 of the compressor body 40 to be closed.

The valve body 116 configures a so-called "poppet valve" in which, in the illustrated example, a valve stem 116a is attached to the circular disc shaped valve body 116, in a configuration in which, in a state in which the valve stem 116a is inserted into a cylindrical shaped sleeve 117 formed inside the body 111, the valve body 116 can be moved so as to advance or retreat along the axial direction of the sleeve 117. This is moreover a configuration in which the valve body 116 is restricted from moving when in a state seated in the valve seat 115a, so as to enable valve closure.

To enable valve closure in this manner, a cylinder 112 is formed to the valve box 111 of the gas intake control valve 11 so as to be coaxial to the sleeve 117, with the cylinder 112 in communication with the inlet passage 115 through the sleeve 117.

There are two chambers inside the cylinder 112, divided by a pressure bearing body (piston 119) including a piston rod 119a inserted into the sleeve 117 from the opposite side to the valve stem 116a of the valve body 116, and a gastight chamber is formed by an end portion of the cylinder 112 being closed by an end plate 118. A valve closure pressure receiving chamber 113 of the gas intake control valve 11 is formed between the end plate 118 and the piston 119, and an auxiliary pressure receiving chamber 114 is formed on the opposite side of the piston 119 to the valve closure pressure receiving chamber 113.

In the illustrated configuration, to make the gas intake control valve 11 a normally open valve, a spring 114a is housed inside the auxiliary pressure receiving chamber 114 to press the piston 119 toward the valve closure pressure receiving chamber 113 side.

The piston rod 119a of the piston 119 and the valve stem 116a of the valve body 116 may be directly connected to each other. However, in the present exemplary embodiment, a compression spring is disposed between the piston rod 119a and the valve stem 116a in a configuration that enables the valve body 116 to maintain a lightly seated state against the valve seat 115a by biasing force of the compression spring even when the piston 119 is in the open valve position retracted toward the left side of FIG. 1.

Due to being configured as described above, the piston 119 moves toward the right side of FIG. 1 when compressed gas is introduced into the valve closure pressure receiving chamber 113, and the piston rod 119a of the piston 119 pushes out the valve stem 116a of the valve body 116 toward the right side of FIG. 1, so that the valve body 116 is fixed in a seated state against the valve seat 115a, thereby closing the gas intake control valve 11.

However, when compressed gas is not being introduced into the valve closure pressure receiving chamber 113, the piston 119 is moved by the spring 114a toward the left side of FIG. 1, the valve body 116 is biased toward the valve seat 115a side by the compression spring provided between the end of the piston rod 119a and the end of the valve stem 116a, so that the valve body 116 is maintained in a lightly seated state against the valve seat 115a.

In this configuration, when the compressor body 40 is started up and there is a negative pressure on the secondary side of the gas intake control valve 11, the valve body 116 separates from the valve seat 115a by overcoming the biasing force of the compression spring provided between the piston rod 119a and the valve stem 116a, opening the inlet passage 115 so as to enable gas intake. The valve body 116 also seats against the valve seat 115a so as to be able to prevent backflow of gas when a backflow has developed from the secondary side of the gas intake control valve 11 to the primary side thereof.

Note that in the engine-driven compressor 1 of the present invention, the configuration of the gas intake control valve 11 to open or close the gas intake port 41 of the compressor body 40 is not limited to the configuration illustrated in FIG. 1. Various known structures may be adopted for the configuration of the gas intake control valve 11 such as, for example, a butterfly valve or the like.

In the gas intake control device 10 configured as described above, the pressure regulation valve 13 is in a closed state when the pressure inside the receiver tank 60 is equal to or less than the datum pressure P2, which is the actuation start pressure of the pressure regulation valve 13 as described above. As a result, the normally open gas intake control valve 11 fully opens the inlet passage 115 when compressed gas from inside the receiver tank 60 is not being introduced into the valve closure pressure receiving chamber 113 of the gas intake control valve 11, and the compressor body 40 performs full-load running to discharge compressed gas at the maximum rate into the receiver tank 60.

When the pressure inside the receiver tank 60 rises so as to exceed the datum pressure P2 due to the rate of consumption of compressed gas on the consumption side reducing, consumption being suspended, or the like, then the pressure regulation valve 13 starts to open, and compressed gas starts to be introduced into the valve closure pressure receiving chamber 113 of the gas intake control valve 11. The gas intake control valve 11 accordingly restricts the inlet passage 115 as the degree of opening of the pressure regulation valve 13 gradually increases with the pressure rising inside the receiver tank 60, so that decreased rate running is thereby performed in which the rate of compressed gas discharged to the receiver tank 60 is reduced.

Subsequently, when the pressure inside the receiver tank 60 has risen further and reached the no-load running pressure P3, the pressure regulation valve 13 becomes fully open, and the gas intake control valve 11 becomes fully closed, and a transition is made to no-load running in which discharge of compressed gas to the receiver tank 60 is suspended.

However, when the pressure inside the receiver tank 60 subsequently falls to less than the no-load running pressure P3 due to consumption of compressed gas resuming on the consumption side or the like, the gas intake control valve 11 starts to open the inlet passage 115, and increased rate running is performed in which the rate of gas discharge to the receiver tank 60 is increased. When the pressure inside the receiver tank 60 falls back again to the datum pressure P2 or less, then the pressure regulation valve 13 closes and the introduction of compressed gas to the valve closure pressure receiving chamber 113 of the gas intake control valve 11 is suspended. The gas intake control valve 11 thereby fully opens the inlet passage 115, and full-load running is resumed in which compressed gas is discharged to the receiver tank 60 at the maximum rate.

By controlling the gas intake of the compressor body 40 and changing the rate at which compressed gas is discharged to the receiver tank 60 according to changes in the pressure inside the receiver tank 60 in this manner, the supply pressure P is controlled to approach a pressure range equal to or greater than the datum pressure P2 but less than the no-load running pressure P3.

Note that although the gas intake control device 10 described with reference to FIG. 1 has a configuration in which opening and closing operations are performed on the gas intake control valve 11 by opening or closing the control passage 12 using the mechanical pressure regulation valve 13 whose opening and closing operations are performed by changes in pressure to the primary side of the gas intake control device 10, the configuration of the gas intake control device 10 is not limited to such a configuration, and various other known configurations may be adopted therefor.

For example, instead of the pressure regulation valve 13, an electro-pneumatic valve capable of changing the degree of opening between fully open and fully closed, according to changes to a control signal input thereto may be provided in the control passage 12, and a pressure sensor provided to detect the pressure inside the receiver tank 60. Then by providing a controller to output the control signal to the electro-pneumatic valve according to the pressure inside the receiver tank 60 as detected by the pressure sensor, the opening and closing and the degree of opening of the electro-pneumatic valve may be controlled according to the pressure inside receiver tank 60 as detected by the pressure sensor, in a configuration that performs gas intake control similarly to as described above.

(2) Speed Control Device (2-1) Device Configuration As described above, the engine-driven compressor 1 of the present invention performs, as capacity control, both the gas intake control described above to control gas intake to the compressor body 40, and speed control to control the rotation speed of the engine 50 driving the compressor body 40. As well as the gas intake control device 10, the engine-driven compressor 1 of the present invention is accordingly also provided with the speed control device 30 to perform rotation speed control on the engine 50.

In the present exemplary embodiment, in which the engine-driven compressor 1 subject to control is installed with the electronically controlled engine 50 to control a fuel injection rate and the like using an engine control unit (ECU) 31 serving as an electronic control device, the speed control device 30 is realized by the ECU 31 and a controller 32 configured from an electronic control device such as a microprocessor or a microcontroller to output speed commands to the ECU 31.

Note that in the illustrated example, an example is illustrated of a configuration in which a pressure sensor 65 is provide on the secondary side of the pressure regulation valve 13 so as to detect changes in the supply pressure P. However, the position of the pressure sensor 65 is not limited thereto, as long as the pressure sensor 65 is able to detect changes to the supply pressure P so as to enable control of the operation of the engine 50 in coordination with the gas intake control by the gas intake control valve 11 as described above. The pressure sensor 65 may, for example, be provided at a position enabling the pressure inside the receiver tank 60 to be detected directly.

Figure 4:
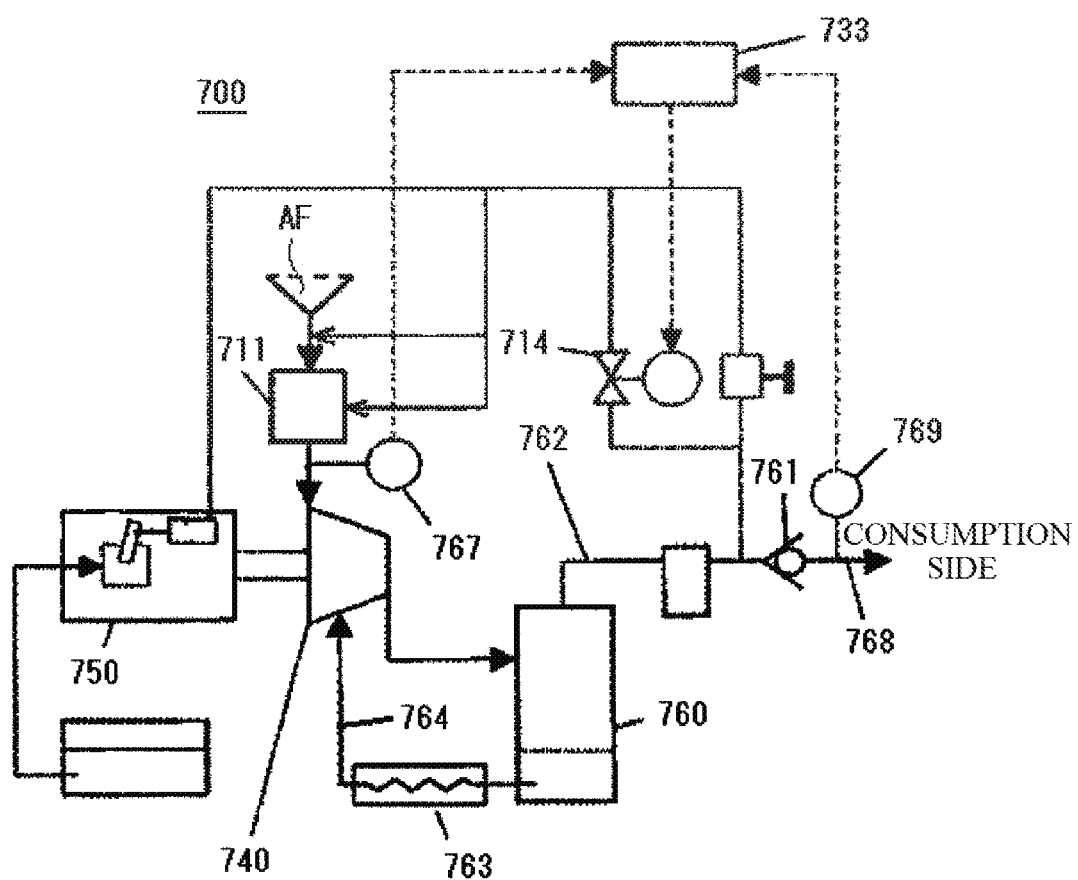
FIG. 4 is an explanatory diagram of a conventional engine-driven compressor (corresponding to FIG. 1 of Japanese Patent No. 5325701).

Furthermore, in cases in which there is a purge mechanism as described with reference to FIG. 4 provided, then a check valve 61 may be provided on a passage extending from the discharge port of the compressor body 40 to the consumption side, and speed control may then be performed based on a detection signal of a pressure sensor detecting the pressure on the secondary side of the check valve 61.

Note that with regard to the transition of the rotation speed of the engine to the no-load rotation speed, as well as the pressure sensor employed in the speed control described above, the transition may also be made when a pressure on the secondary side of the gas intake control valve 11 is detected, by a pressure sensor provided between the gas intake control valve 11 and the gas intake port 41 of the compressor body 40, to be a predetermined negative pressure that indicates that the gas intake control valve 11 is fully closed.

(2-2) Operation of Speed Control Device

Figure 2:
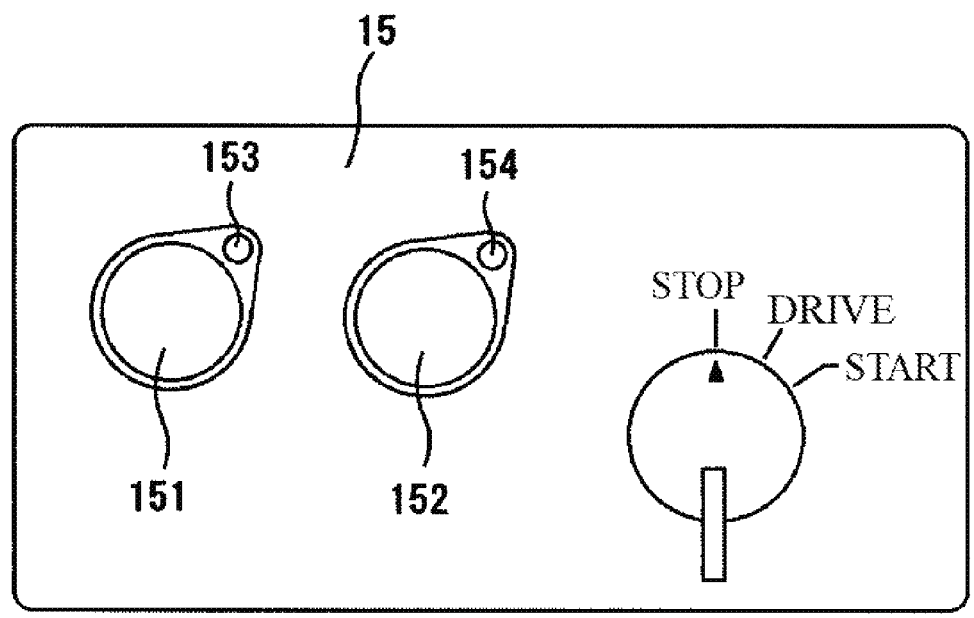
FIG. 2 is a schematic diagram of an operation panel.
Figure 3:
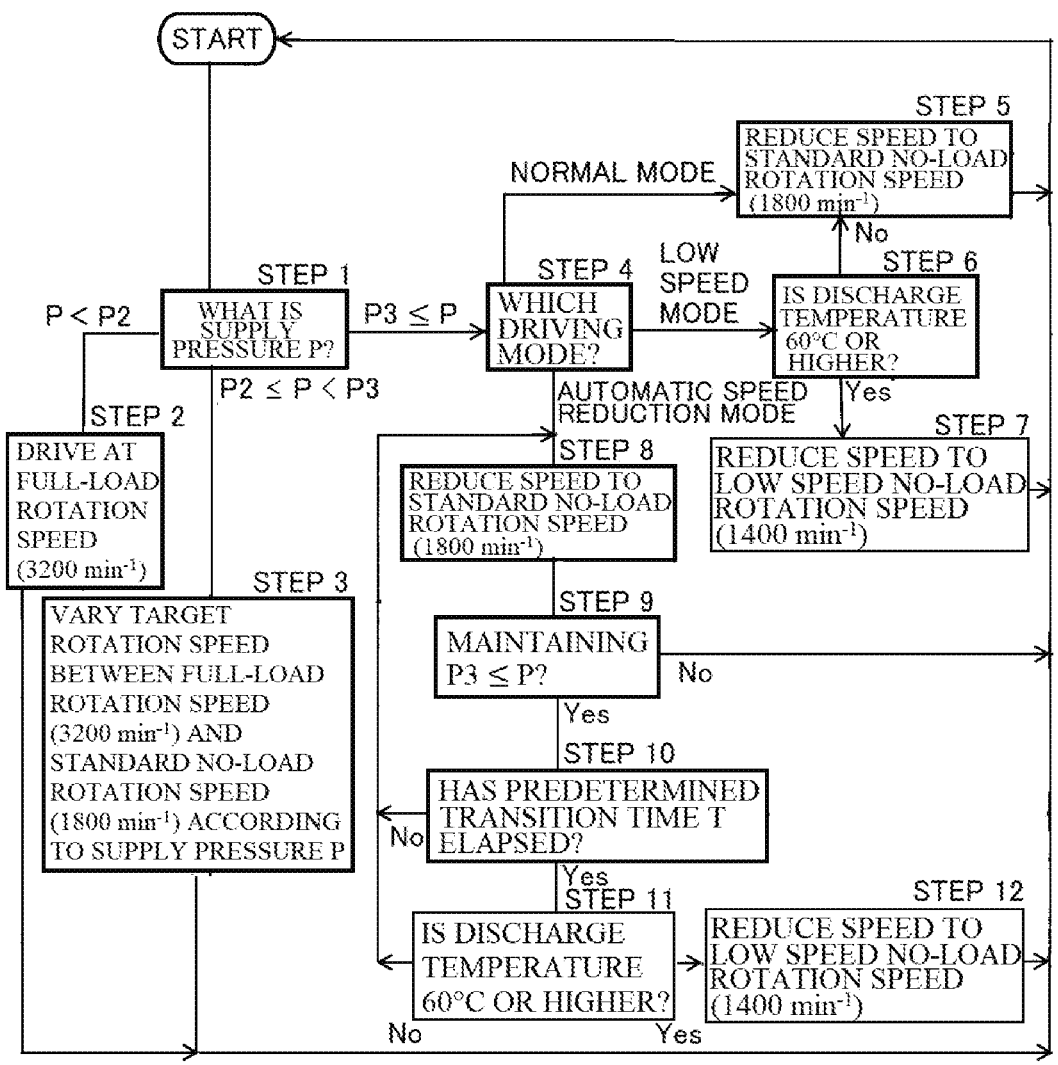
FIG. 3 is a flowchart of speed control in the present invention.

The controller 32 configuring the speed control device 30 as described above is a configuration of the present exemplary embodiment in which, according to settings of driving mode and operating conditions as selected by a user by input through an operation panel 15 illustrated in FIG. 2, the target speed change processing is not performed until the pressure on the secondary side of the pressure regulation valve 13 detected by the pressure sensor 65 has fallen and warming up of the compressor body 40 has been completed. In this configuration, speed control as described below with reference to FIG. 3 is performed according to a temperature in a discharge passage 62 as detected by a temperature sensor 66.

Note that selectable driving modes selected by employing the operation panel 15 illustrated in FIG. 2 in the present exemplary embodiment include the following "automatic speed reduction mode", "normal mode", and "low speed mode".

When a switch 151 provided to the operation panel 15 is pressed for a long duration while a display lamp 153 is in an unilluminated state in an operation to illuminate the display lamp 153, if no-load running continues for a transition time "t", then the basic driving mode of the present invention (hereafter referred to as "automatic speed reduction mode") is selected so as to perform target speed change processing to continue no-load running by automatically reducing the target rotation speed of the engine from the standard no-load rotation speed (for example, 1800 $min^{-1}$) to the low speed no-load rotation speed (for example, 1400 $min^{-1}$).

Moreover, when the switch 151 is pressed for a long duration while the display lamp 153 is in an illuminated state so as to illuminate the display lamp 153, instead of performing the target speed change processing described above, a driving mode equivalent to known no-load running (hereafter referred to as "normal mode") is selected in which the target rotation speed during no-load running is fixed constant at the standard no-load rotation speed (for example, 1800 $min^{-1}$).

Furthermore, when a switch 152 provided to the operation panel 15 is pressed for a long duration while a display lamp 154 is in an unilluminated state so as to illuminate the display lamp 154, instead of performing the target speed change processing described above, a driving mode for performing no-load running (hereafter referred to as "low speed mode") is selected in which the target rotation speed during no-load running is fixed constant at a low speed no-load rotation speed (for example, 1400 $min^{-1}$).

Note that the various types of switch provided to the operation panel may be configured so as to be operable not only prior to starting up the engine-driven compressor 1, but also during operation of the compressor.

During operation of the engine-driven compressor 1, the controller 32 monitors the pressure on the secondary side of the pressure regulation valve 13 using the pressure sensor 65 to determine the supply pressure P (STEP 1 of FIG. 3).

When the gauge pressure of the pressure on the secondary side of the pressure regulation valve 13 is zero, then the controller 32 determines the pressure regulation valve 13 to be in a closed-valve state. The supply pressure P is accordingly determined to be less than the datum pressure P2, which is the actuation pressure of the pressure regulation valve 13 (P<P2 at STEP 1).

Accompanying this determination result, the controller 32 outputs a control signal to the ECU 31 to cause running to be performed with the full-load rotation speed (for example, 3200 min$^{-1}$), which is the maximum value of the rotation speed range for the rotation speed of the engine 50 during capacity control, set as the target rotation speed. The engine is accordingly run at the full-load rotation speed (for example, 3200 min$^{-1}$) (STEP 2).

In the engine-driven compressor 1, the gas intake control valve 11 of the gas intake control device 10 configured as described above is accordingly fully opened thereby, so that the engine 50 performs full-load running at the full-load rotation speed (3200 min$^{-1}$).

Moreover, based on the pressure on the secondary side of the pressure regulation valve 13 detected by the pressure sensor 65, the controller 32 determines whether or not the supply pressure P is in a range equal to or greater than the datum pressure P2 but less than the no-load running pressure P3 set as a predetermined pressure higher than the datum pressure P2 (P2≤P<P3 at STEP 1). Depending on changes to the supply pressure P as represented by the detected pressure on the secondary side of the pressure regulation valve 13, the controller 32 then outputs a control signal to the ECU 31 of the engine 50 to cause the target rotation speed of the engine 50 to be changed in a continuously variable manner between the full-load rotation speed (for example, 3200 min$^{-1}$) and the standard no-load rotation speed (1800 min$^{-1}$) in the present exemplary embodiment, so as to lower the target rotation speed when the detected pressure is high and to raise the target rotation speed when the detected pressure is low (STEP 3).

In the engine-driven compressor 1, the gas intake rate to the compressor body 40 is accordingly changed using the gas intake control device 10 and the rotation speed of the compressor body 40 changes as the rotation speed of the engine 50 is changed, so as to perform reduced rate driving by decreasing the rate of compressed gas discharge by the compressor body 40 as the pressure inside the receiver tank 60 rises, or so as to perform increased rate driving by increasing the rate of compressed gas discharge by the compressor body 40 as the pressure inside the receiver tank 60 falls.

Furthermore, when the controller 32 has determined the supply pressure P to have reached the no-load running pressure P3 or greater based on the detection signal from the pressure sensor 65 (P3≤P at STEP 1), no-load running is performed as described below according to the respective driving mode selected by the user operating the switches 151, 152 provided to the operation panel 15.

A) Automatic Speed Reduction Mode

When the driving mode currently set is the "automatic speed reduction mode" described above ("automatic speed reduction mode" at STEP 4), the controller 32 outputs a control signal to the ECU 31 to cause the engine 50 to run with the predetermined standard no-load rotation speed (1800 min$^{-1}$ in the present exemplary embodiment), which is lower than the full-load rotation speed (3200 min$^{-1}$), set as the target rotation speed, thereby causing the engine to be run at the standard no-load rotation speed (for example, 1800 min$^{-1}$) (STEP 8).

After the target rotation speed has been reduced in speed to the standard no-load rotation speed (1800 min$^{-1}$ in the present exemplary embodiment), the controller 32 determines whether or not the pressure P detected by the pressure sensor 65 is still being maintained at a pressure equal to or greater than the no-load running pressure P3 (STEP 9). In cases in which the pressure is determined to be equal to or greater than the no-load running pressure P3, then further determination is made as to whether or not a predetermined transition time "t" has elapsed from the start of the no-load running (STEP 10).

In the present exemplary embodiment configured so that the target speed change processing to reduce the speed of the target rotation speed to the low speed no-load rotation speed (1400 min$^{-1}$) is not performed until the compressor body 40 has completely warmed up, even in cases in which the transition time "t" has elapsed (Yes at STEP 10), the controller 32 further determines whether or not the temperature inside a discharge passage 62 detected by the temperature sensor 66 is a predetermined temperature (60° C. in the present exemplary embodiment) or higher. In cases in which this temperature is less than the predetermined temperature (60° C.) (No at STEP 11), then the no-load running is continued at the standard no-load rotation speed (for example, 1800 min$^{-1}$) until the temperature inside the discharge passage 62 is the predetermined temperature (60° C.) or higher.

However, in cases in which this temperature is the predetermined temperature (60° C.) or higher (Yes at STEP 11), then a control signal is output to the ECU 31 of the engine 50 to reduce in speed the target rotation speed of the engine 50 to the low speed no-load rotation speed (1400 min$^{-1}$ in the present exemplary embodiment) which is a predetermined rotation speed lower than the standard no-load rotation speed (1800 min$^{-1}$) (STEP 12).

The engine-driven compressor 1 thereby performs no-load running with the rotation speed of the engine at the standard no-load rotation speed (1800 min$^{-1}$) when the gas intake control valve 11 of the gas intake control device 10 has placed the gas intake port 41 of the compressor body 40 in the fully-closed state. The rotation speed of the engine is then reduced in speed to the low speed no-load rotation speed (1400 min$^{-1}$) when a pre-set transition time "t" (for example, a time selectable in a range of from 0 seconds to 60 seconds, and 20 seconds in the present exemplary embodiment) has elapsed, and consumption of compressed gas has not resumed on the consumption side, and the pressure P inside the receiver tank 60 is still being maintained at the no-load running pressure P3 or greater. No-load running is then continued at low fuel cost while continuing to monitor the pressure P inside the receiver tank 60 (STEP 1), and the processing described above is repeated according to the result of monitoring.

However, in cases in which, due to the resumption of consumption of compressed gas on the consumption side or the like, the pressure inside the receiver tank 60 has fallen to less than the no-load running pressure P3 prior to the transition time "t" elapsing (No at STEP 9), then control is performed to increase in speed the rotation speed corresponding to the target rotation speed of the engine based on the changed pressure (STEP 1, STEP 2, STEP 3).

By adopting this approach, the increase in speed in the rotation speed of the engine 50 when, due to the resumption of consumption of compressed gas on the consumption side or the like, the pressure inside the receiver tank 60 has fallen prior to the transition time "t" elapsing can be made to be a rapid increase in speed to the rotation speed targeted by increasing the target rotation speed from the standard no-load rotation speed (1800 min$^{-1}$), which is a relatively high rotation speed, thereby enabling the supply pressure P to be raised quickly to the datum pressure P2 or greater.

Thus appropriately setting the transition time "t" according of the operational pattern employed by pneumatic work tools connected to the consumption side so that the pneumatic work tools resume operation within the transition time "t" enables startup problems etc. with the pneumatic work tools connected to the consumption side to be appropriately prevented from occurring. Moreover, in cases in which the pneumatic work tools deviate from this operational pattern and continue in an inactive state for a prolonged period of the transition time "t" or longer, a low fuel cost and a reduction in noise can be achieved for the no-load running by lowering the rotation speed of the engine. This enables both the operability of the pneumatic work tools to be secured, as well as enabling a low fuel cost and low noise to be achieved.

In the present exemplary embodiment configured so that the target rotation speed of the engine 50 is not reduced to the low speed no-load rotation speed (for example, 1400 $\mathrm{min}^{-1}$) until the temperature inside the discharge passage 62 detected by the temperature sensor 66 is a predetermined temperature (for example, 60° C.) or higher, the warming up of the compressor body 40 might not be sufficiently performed when in a cold environment or the like. Thus in a state in which the viscosity of the lubrication oil is still high and there is a large load on the engine 50, the no-load running is performed at the standard no-load rotation speed (for example, 1800 $\mathrm{min}^{-1}$), without transitioning to the low speed no-load rotation speed (for example, 1400 $\mathrm{min}^{-1}$) until the temperature inside the discharge passage 62 is 60° C. or higher and the warming up of the compressor body 40 is complete. This enables stalling of the engine which might occur with a transition to the low speed no-load rotation speed to be prevented from occurring, and enables early completion of the warming up of the compressor body 40.

Note that the transition time "t" (for example, 20 seconds) until the no-load rotation speed is changed from the standard no-load rotation speed (1800 $\mathrm{min}^{-1}$) to the low speed no-load rotation speed (1400 $\mathrm{min}^{-1}$) may be configured so as to be variable within a predetermined range (for example, a range of from 0 seconds to 60 seconds) according to the type of pneumatic work tool connected to the consumption side and according to the operational pattern (pattern of starting and stopping) employed by such pneumatic work tools. The transition time "t" may be set to 0 (zero) in cases in which the pneumatic work tools connected to the consumption side are tools that would not experience problems such as startup problems even if the pressure of the compressed gas supplied initially at startup was to fall, e.g. air blower.

Setting the transition time "t" to 0 (zero) means that when the pressure inside the receiver tank 60 is the no-load running pressure P3 or greater and the controller 32 makes the transition to no-load running, then other than in cases in which the temperature inside the discharge passage 62 is less than the predetermined temperature (for example, 60° C.), by immediately lowering the target rotation speed of the engine 50 to the low speed no-load rotation speed (for example, 1400 $\mathrm{min}^{-1}$) to perform no-load running thereat, enabling the fuel cost during no-load running to be further improved, and a reduction in noise to also be achieved.

B) Normal Mode

When the "normal mode" is selected by button operation on the operation panel 15 ("normal mode" at STEP 4), the controller 32 does not perform the target speed change processing described above (STEPS 9 to 12), and instead continues to perform no-load running with the target rotation speed of the engine fixed constant at the standard no-load rotation speed (for example, 1800 $\mathrm{min}^{-1}$) (STEP 5), monitors the pressure P detected by the pressure sensor 65 (STEP 1), and changes the rotation speed of the engine based on the result of monitoring.

In this manner, the target speed change processing is not performed during no-load running in the automatic speed reduction mode, and instead no-load running is performed with the target rotation speed for no-load running fixed at the standard no-load rotation speed (for example, 1800 $\mathrm{min}^{-1}$). This enable running problems with work tools to be prevented from occurring even in cases in which the pneumatic work tools connected to the compressor include some work tools that generates a large force immediately after starting up, such as a concrete breaker, and the timing of inactivity and actuation of the work tools cannot be characterized by a pattern.

C) Low Speed Mode

When the "low speed mode" is selected by button operation on the operation panel 15 ("low speed mode" at STEP 4), the controller 32 does not perform the target speed change processing described above (STEPS 9 to 12), and instead performs no-load running with the target rotation speed of the engine fixed constant at the low speed no-load rotation speed (for example, 1400 $\mathrm{min}^{-1}$) (STEP 7).

In the present exemplary embodiment configured so that the target rotation speed of the engine 50 is not lowered to the low speed no-load rotation speed (for example, 1400 $\mathrm{min}^{-1}$) until the temperature inside the discharge passage 62 detected by the temperature sensor 66 has reached the predetermined temperature (for example, 60° C.) or higher, in cases in which the pressure inside the receiver tank 60 has reached the no-load running pressure P3 or greater, except for cases in which the temperature inside the discharge passage 62 is less than the predetermined temperature (for example, 60° C.) (No at STEP 6), the controller 32 immediately decreases the target rotation speed of the engine 50 to the low speed no-load rotation speed (for example, 1400 $\mathrm{min}^{-1}$) to perform no-load running thereat (STEP 7). This enables the fuel cost to be improved and also enables a reduction in noise to be achieved during no-load running Startup Control Device FIG. 1 illustrates a startup control device 20 for starting up the engine 50 when the gas intake port 41 of the compressor body 40 is closed and there is a reduced-load state prior to starting normal running in which the capacity control described above is executed.

In order to reduce the load at startup, in the present exemplary embodiment, a forced valve closure passage 21 is provided to communicate between the receiver tank 60 and the valve closure pressure receiving chamber 113 of the gas intake control valve 11, and a solenoid valve 22 is provided to open and close the forced valve closure passage 21. By then starting up the engine 50 in a state in which the forced valve closure passage 21 has been opened by the solenoid valve 22, in coordination with bypassing the pressure regulation valve 13 and communicating between the receiver tank 60 and the valve closure pressure receiving chamber 113 of the gas intake control valve 11 as the engine 50 is being started up, the gas intake control valve 11 can be closed at a comparatively early time immediately after starting the startup operation of the engine 50 by using the slight rise in pressure inside the receiver tank 60 generated by rotation of the compressor body 40 accompanying the startup operation of the engine 50. This achieves a configuration capable of starting the engine 50 in a reduced-load state.

Thus in the illustrated configuration, the startup control device 20 is formed by the forced valve closure passage 21, the solenoid valve 22 to open and close the forced valve closure passage 21, and the controller 32 to output a control signal to control the opening and closing of the solenoid valve 22.

A configuration of the startup control device 20 is preferably further provided with a gas intake-exhaust passage 23 having one end in communication with the auxiliary pressure receiving chamber 114 of the gas intake control valve 11, a suction passage 24 having one end in communication with the inlet passage 115 on the secondary side of the gas intake control valve 11, and a discharge passage 25 having one end open to the atmosphere (opening to the atmosphere through the inlet passage 115 on the primary side of the gas intake control valve 11 in the example illustrated). The preferable example is also provided with an electromagnetic switching valve 26 at the other end of the gas intake-exhaust passage 23 to selectively communicate with the other end of the suction passage 24 or the other end of the discharge passage 25. By starting up the engine 50 at a predetermined rotation speed (at the standard no-load rotation speed of 1800 $\min^{-1}$ in the present exemplary embodiment) while the gas intake-exhaust passage 23 and the suction passage 24 are placed in a communicating state by operation of the electromagnetic switching valve 26, the operation to close the gas intake control valve 11 can be made even earlier by using the negative pressure generated inside the auxiliary pressure receiving chamber 114 through the suction passage 24 and the gas intake-exhaust passage 23 by the negative pressure inside the inlet passage 115 generated by the compressor body 40 starting to take in gas with the startup operation of the engine 50. This enables a reduction in load to be achieved at an even earlier time after starting the startup operation of the engine 50.

Note that the controller 32 ends startup control by closing the solenoid valve 22 and closing the forced valve closure passage 21 when a predetermined condition has been satisfied, such as the elapse of a transition time since startup or the like. The capacity control described above may then be performed.

Other (Purge Mechanism)

Note that although omitted from illustration, in the method for running control of a compressor of the present invention too, similarly to in the configuration of the engine-driven compressor explained with reference to FIG. 4, a purge valve may also be provided to open the discharge side of the compressor body to the atmosphere. Then when performing no-load running, the configuration may employ a known method for purging, such as performing the no-load running in a state in which load has been further reduced by opening the purge valve.

Although such purging may be performed during the period of no-load running, the purging may be started from the point in time when the target rotation speed during no-load running has been reduced in speed from the standard no-load rotation speed (for example, 1800 $\min^{-1}$) to the low speed no-load rotation speed (for example, 1400 $\min^{-1}$) due to the transition time "t" elapsing. Adopting such a configuration enables the supply pressure P to be raised at an early stage to the pressure of the datum pressure P2 or greater when full-load running is restored during the transition time "t".

When such purging is performed, in place of the pressure sensor 65 that was detecting the pressure inside the control passage 12 at the secondary side of the pressure regulation valve 13 in the configuration illustrated in FIG. 1, a configuration may be adopted in which a pressure sensor is provided at the secondary side of the check valve 61 and speed control is performed while taking the pressure detected by this pressure sensor as the supply pressure P.

In this manner, the rotation speed of the engine 50 can be lowered during no-load running by a combination of target speed change processing and purging while no-load running is being performed. This enables even greater improvements in fuel cost and enables an even greater reduction in noise to be achieved during no-load running by reducing the load as the pressure on the discharge side of the compressor body 40 falls.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

EXPLANATION OF REFERENCE NUMERALS

1. Engine-driven compressor
2. Capacity control device
10. Gas intake control device
11. Gas intake control valve
   111 Body (valve box)
   115 Inlet passage
   115a Valve seat
   116 Valve body
   116a Valve stem
   117 Sleeve
   118 End plate
   119 Piston
   119a Piston rod
12. Control passage
13. Pressure regulation valve
15. Operation panel
   151, 152. Switches
   153, 154. Display lamps
20. Startup control device
21. Forced valve closure passage
22. Solenoid valve
23. Gas intake-exhaust passage
24. Suction passage
25. Discharge passage
26. Electromagnetic switching valve
30. Speed control device
31. Engine control unit (ECU)
32. Controller 40. Compressor body
41. Gas intake port
50. Engine
60. Receiver tank
61. Check valve
62. Discharge passage
63. Oil cooler
64. Oil fill passage
65. Pressure sensor
66. Temperature sensor
700. Engine-driven compressor
711. Gas intake control valve
740 Compressor body
750. Engine
760. Receiver tank
762. Discharge passage
763. Oil cooler
767. Pressure sensor
768. Consumption passage
769. Pressure sensor

The invention claimed is:

1. A method for operation control of a compressor to perform capacity control configured by control of a gas intake rate using a gas intake control valve provided in a gas intake port of a compressor body and by control of a rotation speed of a drive source driving the compressor body so that a pressure of a compressed gas supplied to a consumption side lies within a predetermined range, the capacity control comprising:
   full-load running in which the gas intake control valve is fully open and a target rotation speed of the drive source is set to a full-load rotation speed that is a maximum rotation speed in a speed control band when a supply pressure that is the pressure of the compressed gas supplied to the consumption side is equal to or less than a predetermined datum pressure; and
   no-load running in which the gas intake control valve is fully closed and a predetermined no-load rotation speed is set as the target rotation speed of the drive source, when the supply pressure is equal to or greater than a no-load running pressure that is a predetermined pressure higher than the datum pressure;
   the no-load rotation speed has a predetermined standard no-load rotation speed that is lower than the full-load rotation speed and a low speed no-load rotation speed that is a predetermined rotation speed lower than the standard no-load rotation speed, starting each of the no-load running with the standard no-load rotation speed set as the target rotation speed, when each time the no-load running is performed; and
   performing target speed change processing in which the target rotation speed is reduced in speed to the low speed no-load rotation speed after a predetermined transition time has elapsed from the starting of the no-load running, and then continuing to perform the no-load running.

2. The method of claim 1, wherein the transition time is configured so as to be variable.

3. The method of claim 1, wherein the target speed change processing is not performed in the no-load running until a discharge gas temperature or a lubrication oil temperature of the compressor body is a predetermined temperature or higher.

4. The method of claim 2, wherein the target speed change processing is not performed in the no-load running until a discharge gas temperature or a lubrication oil temperature of the compressor body is a predetermined temperature or higher.

5. The method of claim 1, wherein:
   a check valve is provided partway along a passage extending to the consumption side from a discharge port of the compressor body;
   the capacity control is performed using a pressure on a secondary side of the check valve as the supply pressure; and
   purging is performed during the no-load running by opening a discharge side of the compressor body to the atmosphere at a primary side of the check valve.

6. The method of claim 2, wherein:
   a check valve is provided partway along a passage extending to the consumption side from a discharge port of the compressor body;
   the capacity control is performed using a pressure on a secondary side of the check valve as the supply pressure; and
   purging is performed during the no-load running by opening a discharge side of the compressor body to the atmosphere at a primary side of the check valve.

7. The method of claim 3, wherein:
   a check valve is provided partway along a passage extending to the consumption side from a discharge port of the compressor body;
   the capacity control is performed using a pressure on a secondary side of the check valve as the supply pressure; and
   purging is performed during the no-load running by opening a discharge side of the compressor body to the atmosphere at a primary side of the check valve.

8. The method of claim 4, wherein:
   a check valve is provided partway along a passage extending to the consumption side from a discharge port of the compressor body;
   the capacity control is performed using a pressure on a secondary side of the check valve as the supply pressure; and
   purging is performed during the no-load running by opening a discharge side of the compressor body to the atmosphere at a primary side of the check valve.

9. The method of claim 5, wherein the purging is performed after the starting of the no-load running and after the transition time has elapsed.

10. The method of claim 6, wherein the purging is performed after the starting of the no-load running and after the transition time has elapsed.

11. The method of claim 7, wherein the purging is performed after the starting of the no-load running and after the transition time has elapsed.

12. The method of claim 8, wherein the purging is performed after the starting of the no-load running and after the transition time has elapsed.

13. A compressor comprising:
   a capacity control device configured to perform control of a gas intake rate using a gas intake control valve provided to a gas intake port of a compressor body and to perform control of a rotation speed of a drive source driving the compressor body so that compressed gas is supplied to a consumption side at a pressure lying within a predetermined range;
   the capacity control device being configured to
      perform full-load running in which the gas intake control valve is fully open and a target rotation speed of the drive source is set to a full-load rotation speed that is a maximum rotation speed in a speed control band when a supply pressure that is the pressure of the compressed gas supplied to the consumption side is equal to or less than a predetermined datum pressure; and perform no-load running in which the gas intake control valve is fully closed and a predetermined no-load rotation speed is set as the target rotation speed of the drive source, when the supply pressure is equal to or greater than a no-load running pressure that is a predetermined pressure higher than the datum pressure;

start each of the no-load running with a predetermined standard no-load rotation speed that is lower than the full-load rotation speed set as the target rotation speed, when each time the no-load running is performed; and perform target speed change processing in which the target rotation speed is reduced in speed to a low speed no-load rotation speed that is a predetermined rotation speed lower than the standard no-load rotation speed after a predetermined transition time has elapsed from the starting of the no-load running, and then continue to perform the no-load running.

\* \* \* \* \*